(12) United States Patent
Kim (10) Patent No.: US 9,638,571 B2
(45) Date of Patent: May 2, 2017

(54) GUIDE UNIT FOR MEASUREMENT AND MICRO-WEIGHT MEASURING SYSTEM USING SAME

(71) Applicant: Young Woo Kim, Seoul (KR)

(72) Inventor: Young Woo Kim, Seoul (KR)

(*) Notice: Subject to any disclaimer, the term of this patent is extended or adjusted under 35 U.S.C. 154(b) by 114 days.

(21) Appl. No.: 14/429,398

(22) PCT Filed: Feb. 19, 2014

(86) PCT No.: PCT/KR2014/001328
§ 371 (c)(1),
(2) Date: Aug. 25, 2015

(87) PCT Pub. No.: WO2014/133281
PCT Pub. Date: Sep. 4, 2014

(65) Prior Publication Data
US 2016/0003667 A1    Jan. 7, 2016

(30) Foreign Application Priority Data
Feb. 26, 2013   (KR) .................. 10-2013-0020374

(51) Int. Cl.
*G01G 11/10*   (2006.01)
*G01G 13/04*   (2006.01)
(Continued)

(52) U.S. Cl.
CPC ............. *G01G 13/04* (2013.01); *G01G 11/10* (2013.01); *G01G 13/026* (2013.01); *B65G 47/19* (2013.01)

(58) Field of Classification Search
CPC ...... B65G 47/19; G01G 13/04; G01G 13/026; G01G 13/024; G01G 13/06; G01G 13/08; G01G 11/08; G01G 11/10
See application file for complete search history.

(56) References Cited

U.S. PATENT DOCUMENTS 2,637,434 A * 5/1953 Harper ................. G01G 11/083
                                                    177/121
3,362,585 A * 1/1968 Nessim ............. B01F 15/00194
                                                    198/530
(Continued)

FOREIGN PATENT DOCUMENTS

JP          53-012358 A      2/1978
KR   10-1992-0010593 B1     12/1992
(Continued)

OTHER PUBLICATIONS

International Search Report for PCT/KR2014/001328 mailed Jun. 24, 2014 from Korean Intellectual Property Office.

*Primary Examiner* — Randy Gibson
(74) *Attorney, Agent, or Firm* — Novick, Kim & Lee, PLLC; Jae Youn Kim (57) ABSTRACT

The present invention relates to a guide unit for measurement acting as a guide for measuring the micro-weight of fine grains having minute weight and volume, such as powders, granules, seeds and pills, and to a micro-weight measuring system for accurately measuring the fine grains by a preset micro-weight by using the guide unit for measurement. The present invention has an effect of being capable of measuring the micro-weight as a unit to thereby package fine grains such as powders, granules, seeds and pills by micro-weight unit. In addition, the present invention has an effect of being capable of accurately measuring the fine grains by the preset micro-weight in such a manner that in the procedure of discharging a one-unit-micro-weight of the fine grains, some of the fine grains are discharged at a smaller amount than the initially-discharged amount and are finally discharged by dropping.

10 Claims, 5 Drawing Sheets

(51) Int. Cl.
*G01G 13/06* (2006.01)
*G01G 13/08* (2006.01)
*G01G 13/02* (2006.01)
B65G 47/19 (2006.01)

(56) References Cited

U.S. PATENT DOCUMENTS

| | | | | |
|---|---|---|---|---|
| 3,777,874 | A * | 12/1973 | Birckhead | B05B 5/032 |
| | | | | 118/308 |
| 3,865,278 | A * | 2/1975 | Gallati | G01G 13/08 |
| | | | | 222/161 |
| 4,136,804 | A * | 1/1979 | Kinzler | B65D 88/64 |
| | | | | 222/506 |
| 4,569,446 | A * | 2/1986 | Kelley | B07B 1/4654 |
| | | | | 177/123 |
| 4,938,385 | A | 7/1990 | Hayashi | |
| 5,657,902 | A * | 8/1997 | Kraus | B65G 65/44 |
| | | | | 198/532 |
| 5,767,455 | A * | 6/1998 | Mosher | G01G 13/026 |
| | | | | 177/116 |
| 5,938,074 | A * | 8/1999 | Dartus | G01G 13/026 |
| | | | | 177/50 |
| 6,417,464 | B2 * | 7/2002 | Steele | B65G 27/00 |
| | | | | 177/105 |
| 6,736,258 | B2 * | 5/2004 | Noda | B28B 13/02 |
| | | | | 198/532 |
| 2014/0044507 | A1 * | 2/2014 | Naizer | B65G 43/00 |
| | | | | 414/288 |

FOREIGN PATENT DOCUMENTS

| | | |
|---|---|---|
| KR | 10-2001-0084091 A | 9/2001 |
| KR | 10-2013-0003941 A | 1/2013 |

* cited by examiner

GUIDE UNIT FOR MEASUREMENT AND MICRO-WEIGHT MEASURING SYSTEM USING SAME

CROSS REFERENCE TO PRIOR APPLICATION

This application is a National Stage Patent Application of PCT International Patent Application No. PCT/KR2014/001328 (filed on Feb. 19, 2014) under 35 U.S.C. §371, which claims priority to Korean Patent Application No. 10-2013-0020374 (filed on Feb. 26, 2013) which are all hereby incorporated by reference in their entirety.

TECHNICAL FIELD

The present invention relates to a guide unit for measurement and a micro-weight measuring system using the guide unit for measurement, and more particularly, to a guide unit for measurement acting as a guide for measuring the micro-weight of fine grains having minute weight and volume, such as powders, granules, seeds and pills, and to a micro-weight measuring system for accurately measuring the fine grains by a preset micro-weight by using the guide unit for measurement

BACKGROUND ART

As a prior art, a powder feeding apparatus described in Korean Laid-Open Patent Application No. 10-2001-0084091 has a simple configuration such that it can be stored, carried along and moved, can accurately measure an optimal amount, and is coupled with a supplying milk powder container and a nursing bottle to be supplied, respectively at the time of discharge, and thus prevents overflow and the like at the time of supply, thereby allowing safe and accurate supply.

However, unlike the present invention, the prior art does not have a unit for constantly feeding fine grains through a single discharging port so that micro-weight (a minimum of 0.3 g to 1000 g is taken as a unit) can be measured as a unit, and cannot perform a first stage-control for discharging the fine grains by a certain amount, perform a second stage-control so that some of the micro-weight of the fine grains are discharged by a less amount than the discharge amount in the first stage-control during the discharge through the first stage-control, and finally perform a third stage-control so that the fine grains are discharged by dropping, and thus have a problem that it cannot accurately measure the discharged amount.

As another prior art, a powder metallurgy measuring apparatus is described in Korean Laid-Open Patent Application No. 10-2013-0003941, wherein fine metal powders supplied from a hopper is fed through a first feeding plate for feeding a large amount until a range near a weight to be measure is reached, and after a certain range has been reached, the powders are fed only through a second feeding plate for feeding a minute amount while the feeding of the metal powders through the first feeding plate is interrupted, and thus the metal powders having a strong tendency to agglomerate together due to their specific gravity can be automatically measured in the form of fine metal powders, not in the granular form, by a multi-stage measuring unit provided with the first and second feeding plates, whereby operational convenience is enhanced and cost required for a measuring operation is noticeably reduced.

However, unlike the present invention, the prior art does not have a unit for constantly feeding fine grains through a single discharging port so that micro-weight (a minimum of 0.3 g to 1000 g is taken as a unit) can be measured as a unit, and cannot perform a first stage-control for discharging the fine grains by a certain amount, perform a second stage-control so that some of the micro-weight of the fine grains are discharged by a less amount than the discharge amount in the first stage-control during the discharge through the first stage-control, and finally perform a third stage-control so that the fine grains are discharged by dropping, and thus have a problem that it cannot accurately measure the discharged amount.

SUMMARY OF THE INVENTION

Technical Problem

Therefore, the present invention was made to solve the above-mentioned problems, and its object is to provide a guide unit for measurement which discharges fine grains such as powders, granules, seeds and pills so that a micro-weight of the fine grains can be easily measured.

Another object is to provide a micro-weight measuring system using the guide unit for measurement, which system measures fine grains discharged through the guide unit for measurement by a micro-weight unit.

Solution to the Problem

According to an embodiment of the present invention for achieving the above-mentioned objects, a guide unit for measurement is provided which includes a body part temporarily storing fine grains such as powders, granules, seeds and pills; a first adjusting part which has a first handle rod for adjusting an adjustment plate movable in an up-and-down direction from a bottom of the body part to a certain level, the fine grains being constantly fed through a gap created by adjustment of the first handle rod; a guide part wherein a first guide fixing member is provided on a wall surface of the body part and a second guide fixing member is provided on a wall surface opposite to the first guide fixing member and wherein a first elastic guide plate is coupled at its one side with the first guide fixing member and a second elastic guide plate is coupled at its one side with the second guide fixing member, therefore, the fine grains which have passed through the first adjusting part are guided and moved to between the other side of the first elastic guide plate and the other side of the second elastic guide plate; and a second adjusting part wherein a first plate and a second plate are provided and a first fixing frame coupled with the first plate and a second fixing frame coupled with the second plate are provided and wherein the other side of the first elastic guide plate coupled at its one side with the first guide fixing member is fixed to the first fixing frame and the other side of the second elastic guide plate is fixed to the second fixing frame and wherein a second handle rod is provided which adjusts a gap between the first plate and the second plate depending on the adjustment of a gap between the first fixing frame and the second fixing frame, the fine grains passing through the guide part being discharged between the first plate and the second plate.

According to another embodiment of the present invention, a micro-weight measuring system using a guide unit for measurement is provided which includes an indicator which produces a weight setting signal, a small-feed setting signal and a dropping signal; a client which produces a first control signal for performing a control by reception of the weight setting signal in such a manner that the fine grains are fed by a first weight corresponding to the weight setting signal, produces a second control signal for performing a control in such a manner that the fine grains are fed by a second weight corresponding to the small-feed setting signal if the small-feed setting signal is received during the discharge of the fine grains by the first weight, and produces a third control signal for performing a control in such a manner that the fine grains are fed by a third weight corresponding to the dropping signal if the dropping signal is received during the discharge of the fine grains by the second weight; and a device for measurement which comprises a hopper for storing the fine grains; a guide unit for measurement which constantly discharges the stored fine grains from the hopper; a vibrator which vibrates such that the fine grains discharged through the guide unit for measurement are discharged by the first weight by the first control signal and vibrates such that the fine grains are discharged by the second weight by the second control signal, wherein the vibration is stopped so that the fine grains are discharged by the third weight through the dropping by the third control signal; a container which stores the fine grains discharged through the guide unit for measurement by the first, second and third control signals of the vibrator in order to measure the fine grains; and a balance which measures the fine grains stored in the container.

Effects of the Invention

The present invention has an effect of being capable of measuring the micro-weight as a unit to thereby package fine grains such as powders, granules, seeds and pills by micro-weight unit. In addition, the present invention has an effect of being capable of accurately measuring the fine grains by the preset micro-weight in such a manner that during the discharge of a one-unit-micro-weight of the fine grains, some of the fine grains are discharged at a smaller amount than the initially-discharged amount and are finally discharged by dropping.

BEST MODES FOR CARRYING OUT THE INVENTION

Hereinafter, optimal embodiments of the present invention will be described regarding their configurations and operations with reference to the attached drawings.

Prior to describing the optimal embodiments, first, application of a guide unit for measurement of the present invention will be briefly described. The guide unit for measurement guides seeds consisting of fine grains such as rice, barley and pumpkin seeds; granules consisting of fine grains made by drying small fruits such as grapes, garlic and the like; powders consisting of coffee, seasoning or fine grains made by minutely breaking or grinding hard objects in such an extent that the objects become soft; and pills consisting of fine grains made by powdering medicinal ingredients such as Korean angelica root, tangerine peel and the like and kneading the powders into a spherical form so that they can be measured with an electronic balance by a micro-weigh unit.

Figure 1:
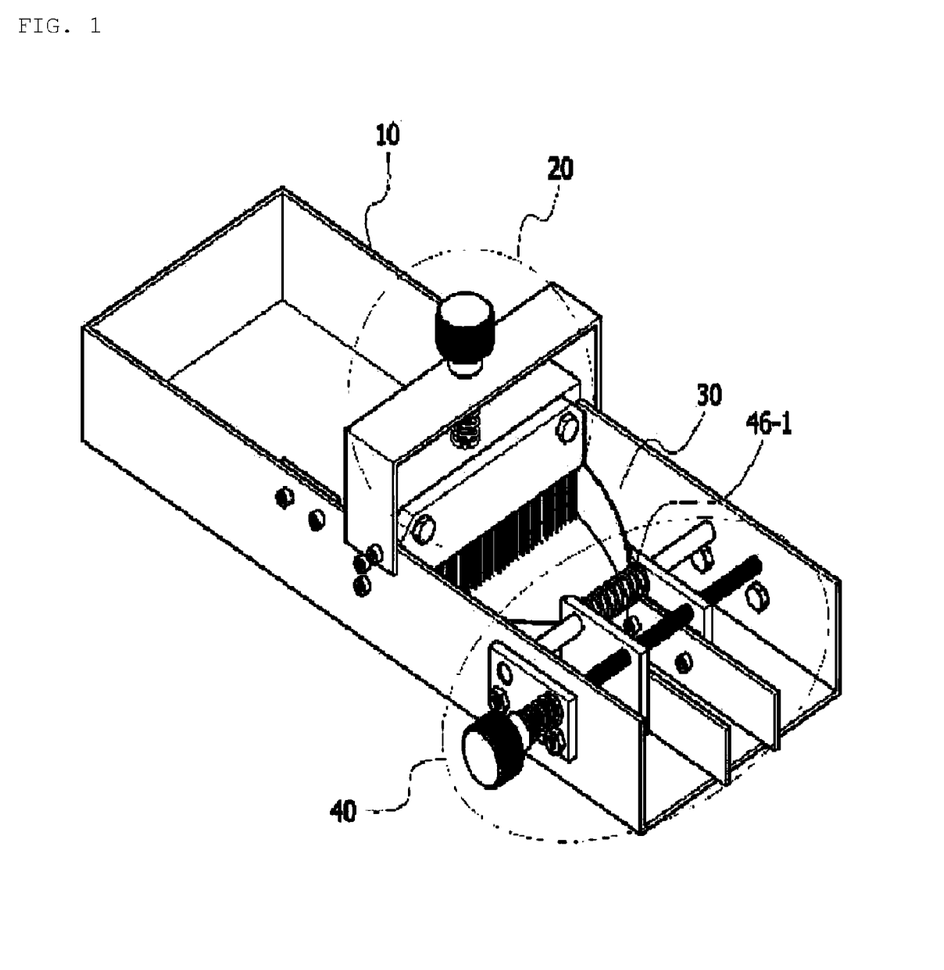
FIG. 1 is a perspective view of a guide unit for measurement according to an embodiment of the present invention.

FIG. 1 is a perspective view of a guide unit for measurement according to an embodiment of the present invention. The guide unit for measurement has a body part (10), a first adjusting part (20), a guide part (30) and a second adjusting part (40).

In more particular, the body part (10) temporarily stores fine grains such as powders, granules, seeds and pills.

In other words, the body part (10) temporarily stores the fine grains coming from a storing unit such as a hopper containing the fine grains in great quantities so that the fine grains pass through the first adjusting part (20) and via the guide part (30) and are then discharged through the second adjusting part (40) by micro-weight.

Figure 2:
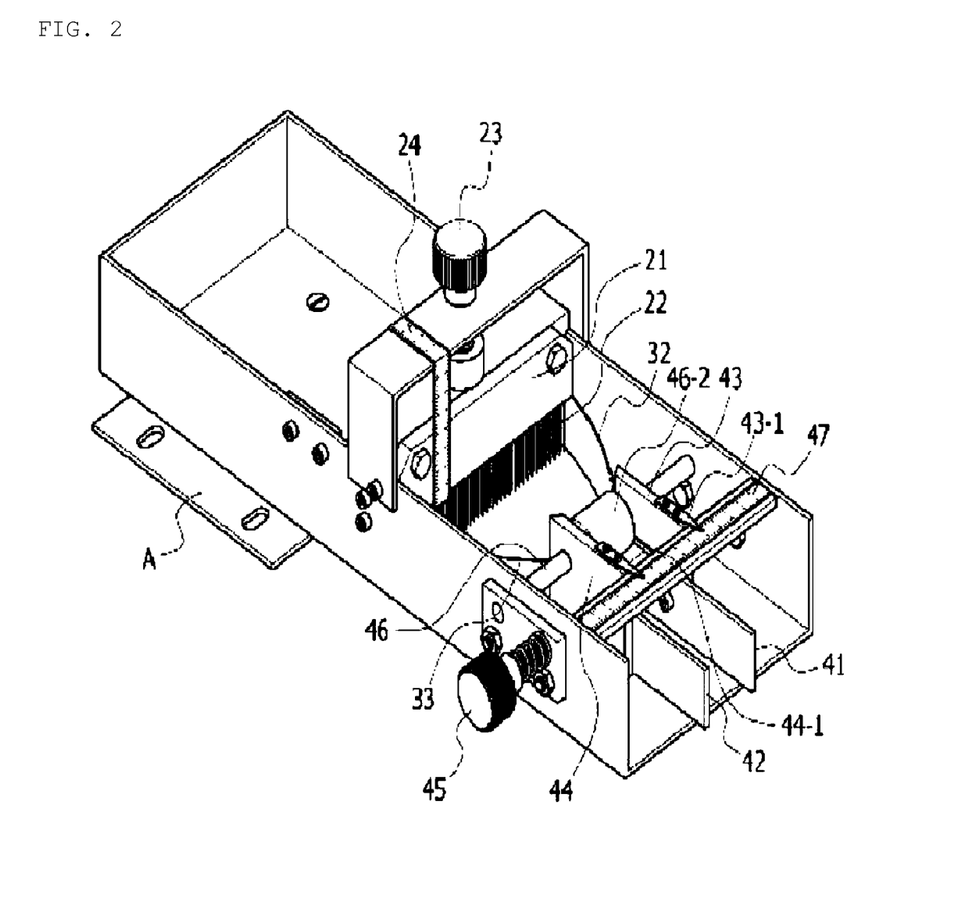
FIG. 2 is a perspective view of another guide unit for measurement according to an embodiment of the present invention.

Meanwhile, "A" indicated in FIG. 2 designates a body base for coupling of the guide unit for measurement of the present invention with a vibrator of a device for measurement, and FIG. 1 illustrates only essential elements of the present invention which are helpful in understanding the present invention.

The first adjusting part (20) has a first handle rod (23) for adjusting an adjustment plate (21) which is moved in an up-and-down direction from a bottom of the body part (10) to a certain level, and the fine grains are constantly fed through a gap created by adjustment of the first handle rod (23).

In other words, the first adjusting part (20) allows the gap to be formed by the adjustment of the first handle rod (23) in order to constantly feed the fine grains temporarily stored in the body part (10) to the guide part (30) at a constant amount, and the amount of feed at which the fine grains are constantly fed can be changed depending on a size of the gap.

It is preferable that hair (22) is further provided at an end of the adjustment plate (21). The purpose of providing the adjustment plate (21) with the hair (22) is to prevent germination percentage from being significantly lowered due to air, moisture and temperature when seed coats of seeds such as rice, barley and pumpkin seed are damaged.

For example, the adjustment plate of the present invention is made of metallic material such as iron and aluminum, and if the end of the adjustment plate (21) is made of metallic material like the adjustment plate (21) made of metal material without the use of the hairs (22), the seed coats may be damaged as the fine grains contact with the end of the adjustment plate (21) while moving to the guide part (30).

Therefore, it is preferable to prevent the damage of the seed coats by providing the hair (22).

In particular, it is preferable that a first graduated ruler (24) is further provided which can measure a height of the gap created by the adjustment of the first handle rod (23).

For example, if rose moss seeds having a size of 2 mm to 3 mm are moved while the gap between the bottom of the body part (10) and the end of the adjustment plate (21) or between the bottom of the body part (10) and an end of the hairs (22) is adjusted to have the height of about 1 cm, the rose moss seeds can be easily moved to the guide part (30). However, in the case of the pumpkin seeds, the size of the pumpkin seeds are about 1 cm to 1.5 cm, therefore, it is difficult for the pumpkin seeds to pass through the gap having the height of 1 cm and thus to move to the guide part (30).

Therefore, as illustrated in FIG. 2, the first adjusting part (20) is further provided with the first graduated ruler (24) so as to allow more accurate adjustment than a case where a person intuitively adjusts the gap with his/her eye measurement.

In the guide part (30), a first guide fixing member (31) is provided on a wall surface of the body part (10) and a second guide fixing member (not illustrated) is provided on a wall surface opposite to the first guide fixing member (31). Furthermore, a first elastic guide plate (32) is coupled at its one side with the first guide fixing member (31) and a second elastic guide plate (33) is coupled at its one side with the second guide fixing member (not illustrated). Therefore, the fine grains which have passed through the first adjusting part (20) are guided and moved to between the other side of the first elastic guide plate (32) and the other side of the second elastic guide plate (33).

The first guide fixing member (31) and the first elastic guide plate (32) are described with reference to FIG. 3. The first guide fixing member (31) is coupled with the wall of the body part (10) such that a first gap (31-1) is formed. The one side of the first elastic guide plate (32) is inserted in the gap (31-1) and the other side of the first elastic guide plate (32) is fixed to a first fixing frame (43).

Therefore, if the first and second fixing frames (43, 44) are moved from in a right-and-left direction by adjustment of a second handle rod (45) provided at the second adjusting part (40), a gap between first and second plates (41, 42) coupled with the first and second fixing frames (43, 44) is adjusted accordingly.

Figure 3:
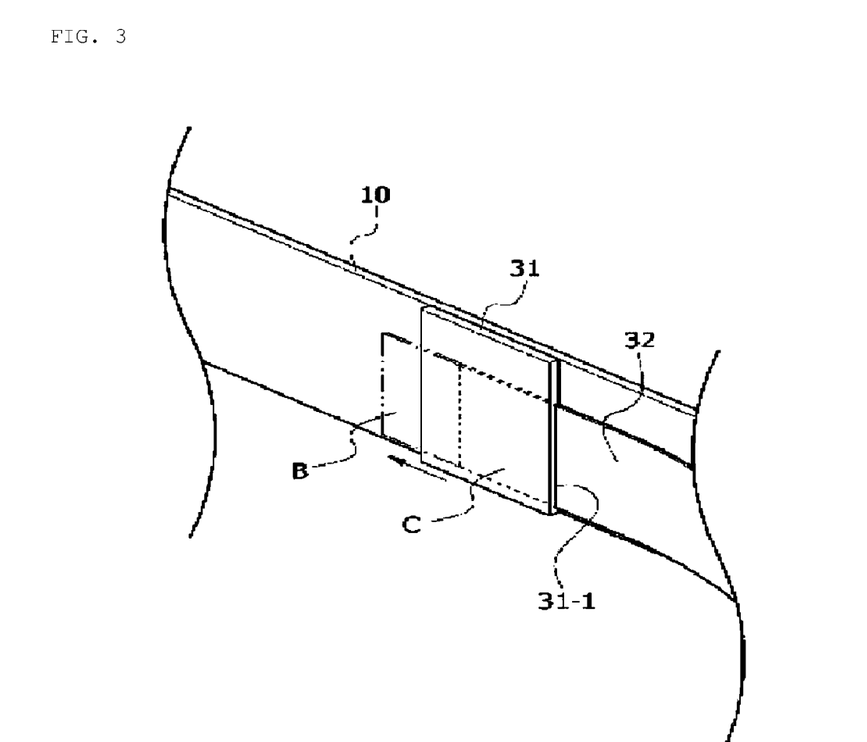
FIG. 3 shows a coupled state of a first guide fixing member and a first elastic guide plate according to an embodiment of the present invention.

In this connection, if the gap between first and second plates (41, 42) becomes wider, the first elastic guide plate (32) is brought into a position designated by "B" in FIG. 3 and if the gap between first and second plates (41, 42) becomes narrower, the first elastic guide plate is brought into a position designated by "C" in FIG. 3.

Regarding allowing of the movement to the positions such as the positions (B, C), the reason for providing of the first guide fixing member (31) and the second guide fixing member (not illustrated) and the first and second elastic guide plates (32, 33) is that the first and second elastic guide plates (32, 33) need to be changed in their length and to have elasticity in order that the first and second elastic guide plates (32, 33) are moved for adaption to wider or narrower adjustment of the gap between the first and second plates (41, 42) when the fine grains which have passed through the first adjusting part (20) are moved to the second adjustment part (40).

In addition, the second guide fixing member moves in an identical or similar manner to the first guide fixing member (31) described above and also the second elastic guide plate in an identical or similar manner to the first elastic guide plate (32), and thus a person skilled in the art may fully realize the second guide fixing member and the second elastic guide plate from the first guide fixing member (31) and the first elastic guide plate (32), so that detailed description thereof and related illustration in the drawings are omitted.

In the second adjusting part (40), the first plate (41) and the second plate (42) parallely face each other, and the first fixing frame (43) coupled with the first plate (41) and the second fixing frame (44) coupled with the second plate (42) are provided, and the other side of the first elastic guide plate (32) coupled at its one side with the first guide fixing member (31) is fixed to the first fixing frame (43), and the other side of the second elastic guide plate (33) is fixed to the second fixing frame (44), and the second handle rod (45) is provided which adjusts the gap between the first plate (41) and the second plate (42) depending on the adjustment of the gap between the first fixing frame (43) and the second fixing frame (44), and thus the fine grains passing through the guide part (30) are discharged between the first plate (41) and the second plate (42).

In more particular, first, the second adjusting part (40) is such that the first plate (41) is coupled with the first fixing frame (43) and the second plate (42) is coupled with the second fixing frame (44), and the reason for this is that the fine grains temporarily stored in the body part (10) of the guide unit for measurement are discharged by means of vibration of a vibrator so that the guide unit for measurement of the present invention can discharge the fine grains by micro-weight; in this connection, if the first and second plates (41, 42) are directly coupled with the second handle rod (45) without using the first and second fixing frames (43, 44), a lift phenomenon occurs due to the vibration of the vibrator and threads of the second handle rod (45) and thus the fine grains cannot be constantly discharged; to prevent this, the first fixing frame (43) is coupled with the first plate (41) and the second fixing frame (44) is coupled with the second plate (42).

In this way, since the first fixing frame (43) and the first plate (41) are coupled with each other and the second fixing frame (44) and the second plate (42) are coupled with each other, the first and second plates (41, 42) coupled with the first and second fixing frames (43, 44) are adjusted through the adjustment of the first and second fixing frames (43, 44) by the second handle rod (45).

In addition, in the above, the first fixing frame (43) coupled with the first plate (41) is described as being separate from the first plate only for the purpose of helping to understand the invention; it is preferable that the first fixing frame (43) coupled with the first plate (41) is formed integrally with the first plate. Likewise, the second fixing frame (44) coupled with the second plate (42) is described as being separate from the second plate only for the purpose of helping to understand the invention; however, it is preferable that the second fixing frame (44) coupled with the second plate (42) is formed integrally with the second plate. The coupling of the first fixing frame (43) with the first plate (41) and the coupling of the second fixing frame (44) with the second plate (42) are considered to be integral within the scope of claims of the present invention.

Meanwhile, a spacing buffer rod (46) is preferably further provided which is disposed in parallel to the second handle rod (45) and is coupled with the first and second fixing frames (43,44) and which has a spring between the first and second fixing frames (43,44). The second handle rod (45) has threads which consist of right-handed threads on one side with respect to a center of the second handle rod and left-handed threads on the other side, and thus the gap between the first and second plates (41, 42) can be adjusted in the right-and-left direction.

In other words, the spacing buffer rod (46) is coupled with the first and second fixing frames (43,44) parallely to the second handle rod (45) and the spacing buffer rod (46) has the spring (46-1) between the first and second fixing frames (43,44), which spring (46-1) may further have a spring cover (46-2) as illustrated in FIG. 2. As the spring (46-1) acts to push the first and second fixing frames (43,44), the first and second fixing frames (43, 44) caught by the threads formed on the second handle rod (45) are brought into close contact with the threads. Accordingly, the gap between the first and second plates (41, 42) coupled with the first and second fixing frames (43, 44) can be constantly and continually kept even when the vibration(chattering) of the vibrator occurs.

In particular, it is preferable to further provide a first indication needle (43-1) positioned on a top of the first fixing frame (43) for indicating the first plate (41), a second indication needle (44-1) positioned on a top of the second fixing frame (44) for indicating the second plate (42) and a second graduated ruler (47) for representing the spacing between the first indication needle (43-1) and the second indication needle (44-1).

The reason for providing of the first indication needle (43-1), the second indication needle (44-1) and the second graduated ruler (47) is that even if the spacing between the first plate (41) and the second plate (42) is about 3 cm for example, the rose moss seeds can be easily discharged passing through the spacing of about 3 cm since the rose moss seeds are very fine grains having a diameter of about 2 mm to 3 mm, however, larger pumpkin seeds having a diameter of about 1 cm to 1.5 cm cannot easily pass through the spacing of about 3 cm since the pumpkin seeds are larger and thus caught by each other, therefore, the spacing between the first plate (41) and the second plate (42) has to be increased.

Therefore, in order to enable a user to adjust the spacing between the first plate (41) and the second plate (42) depending on the size of seeds, the first indication needle (43-1), the second indication needle (44-1) and the second graduated ruler (27) are further provided.

Figure 4:
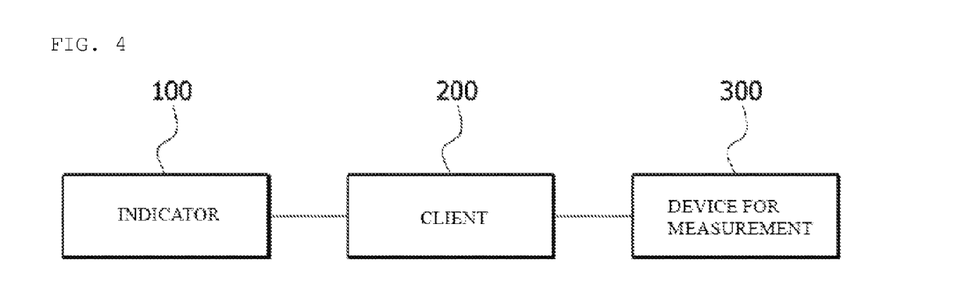
FIG. 4 is a block diagram showing a micro-weight measuring system using the guide unit for measurement according to another embodiment.

FIG. 4 is a block diagram showing a micro-weight measuring system using the guide unit for measurement according to another embodiment. The micro-weight measuring system using the guide unit for measurement includes an indicator (100), a client (200) and a device for measurement (300).

In more particular, the indicator (100) produces a weight setting signal and also produces a small-feed setting signal and a dropping signal.

Figure 5:
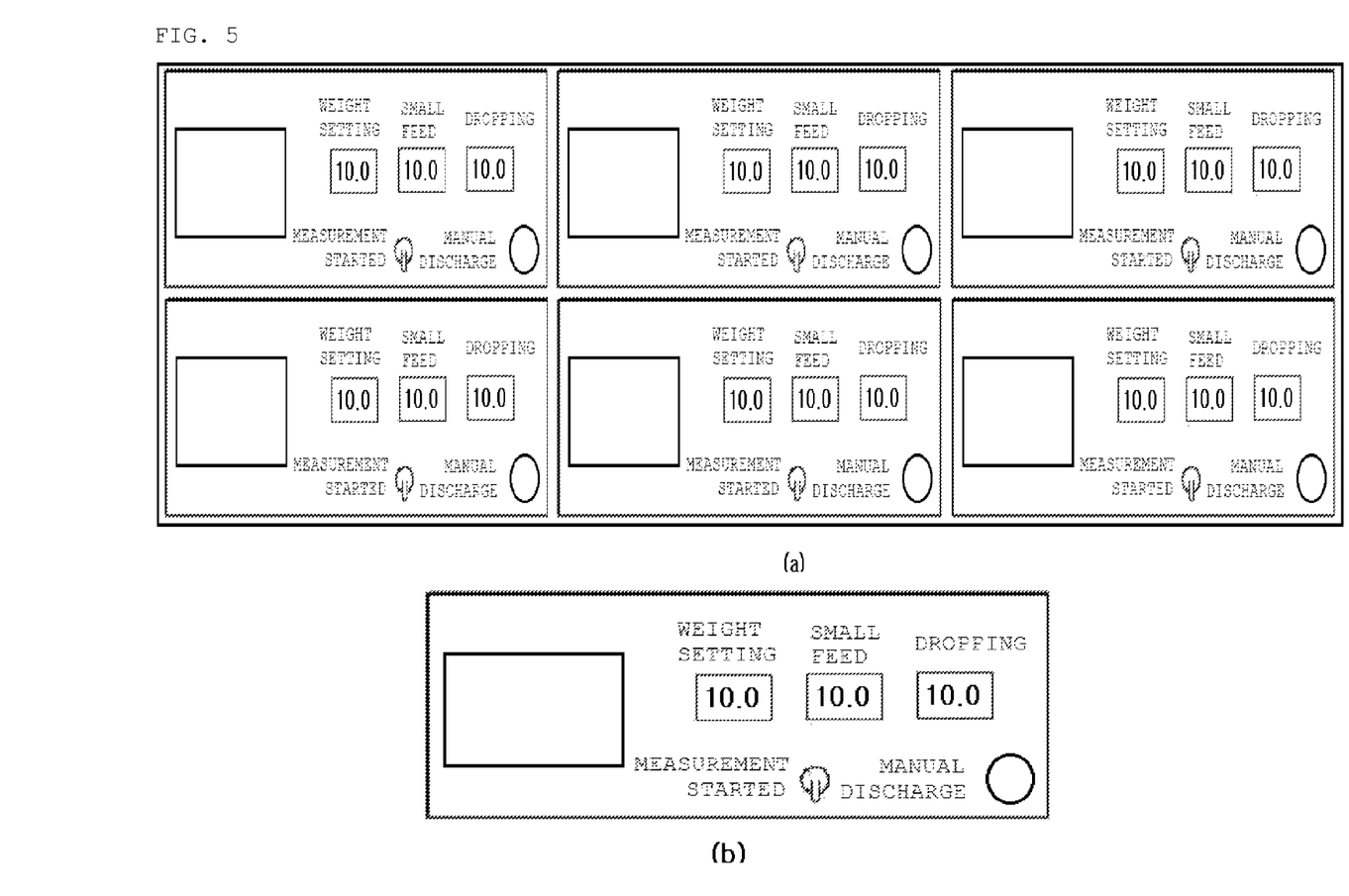
FIG. 5 illustrates an example of an input pad for producing a weight setting signal, a small-feed setting signal and a dropping signal according to an embodiment of the present invention.

The indicator (100) has an input pad for producing the weight setting signal, the small-feed setting signal and the dropping signal. As a plurality of the devices for measurement including the guide unit for measurement are provided as illustrated in FIG. 5(*a*), it is preferable to provide a plurality of the input pads in a number corresponding to the number of the devices foe measurement. FIG. 5(*b*) illustrates the input pad for inputting a set value in order to produce the weight setting signal, the small-feed setting signal and the dropping signal in one guide device for measurement.

Description will be made of each of the weight setting signal, the small-feed setting signal and the dropping signal produced by using the input pad. First, the weight setting signal is a signal set so as to allow the fine grains such as powders, granules, seeds and pills discharged from the guide device for measurement to be discharged by an amount accurately set in a micro-weight unit.

For example, if the weight setting signal is set as 10 g by the user as illustrated in FIG. 5(*b*) (a final unit of the weight setting illustrated is a unit below the decimal point), the guide device for measurement discharges the fine grains by 10 g.

In particular, the present invention is intended to measure micro-weight such as the fine grains. The weight setting signal is preferably set so that a minimum unit of micro-weight of the fine grains discharged from the guide device for measurement is from 0.3 g to a maximum of 1000 g.

According to prior art, when the fine grains are to be measured by micro-weight and packed in a package, the micro-weight cannot be measured; therefore, the fine grains are fed and packed in the package while exceeding the micro-weight measured, and accordingly, a significant loss is caused.

A typical example of the loss is shown in Korean Laid-Open Patent Application No 10-2013-0003941 previously described, and the reason is that, as the first feed plate and the second plate are two elements separate from each other, an amount added by dropping when the first feeding plate is blocked and an amount added by dropping when the second feeding plate is blocked are added up, therefore, an accurate amount cannot be packed and more amount than a preset amount is further additionally packed.

However, in the present invention, the fine grains such as powders, granules, seeds and pills are discharged between the first and second plates (41, 42; a single discharge port) of the guide unit for measurement by micro-weight unit of 0.3 g to 1000 g and thus accurately measured.

Next, the small-feed setting signal is a signal which allows a small amount set by the small-feed setting signal to be discharged if the small amount remains during the discharge of the fine grains onto an electronic balance up to an amount set by the weight setting signal.

For example, if the small-feed setting signal is set as 2 g by the user as illustrated in FIG. 5(*b*), the guide device for measurement discharges 8 g of 10 g and remaining 2 g is then small amount-discharged.

In the case of discharging of the fine grains through the guide device for measurement by the weight setting signal, the amount of discharge is determined by the vibration (chattering) of the vibrator provided at the guide device for measurement. In the case of discharging of the fine grains through the guide device for measurement by the small-feed setting signal, a small amount is discharged by making the vibration(chattering) of the vibrator provided at the guide device for measurement weaker than the vibration(chattering) of the vibrator caused by the weight setting signal.

Next, the dropping signal is a signal which stops the small-amount discharge from the guide device for measurement in order to measure an accurate micro-weight, including an amount fed by the dropping, if the amount of feed by the dropping remains during the discharge of the fine grains up to an amount set by the small-feed setting signal.

In particular, the input pad for producing the weight setting signal, the small-feed setting signal and the dropping signal is preferably realized in an analog type, but it is also preferred that the input pad is realized in a digital type.

For example, if the dropping signal is set as 0.25 g by the user as illustrated in FIG. 5(*b*), 1.75 g of 2 g small amount-fed is discharged from the guide device for measurement and then remaining 0.25 g is discharged using the dropping.

Therefore, the indicator (100) detects the discharged amount while producing the weight setting signal, the small-feed setting signal and the dropping signal.

The client (200) produces a first control signal for performing a control by reception of the weight setting signal in such a manner that the fine grains are fed by a first weight corresponding to the weight setting signal, produces a second control signal for performing a control in such a manner that the fine grains are fed by a second weight corresponding to the small-feed setting signal if the small-feed setting signal is received during the discharge of the fine grains by the first weight, and produces a third control signal for performing a control in such a manner that the fine grains are fed by a third weight corresponding to the dropping signal if the dropping signal is received during the discharge of the fine grains by the second weight.

Hereinafter, each of the first, second and third control signals will be described. First, the first control signal is a signal for causing the vibration(chattering) of the vibrator provided at the device for measurement (300) so as to discharge the fine grains by the first weight corresponding to the weight setting signal if the weight setting signal is received.

Next, the second control signal is a signal for causing the vibration(chattering) of the vibrator so as to discharge the fine grains by the second weight by making the vibration of the vibrator provided at the device for measurement (300) weaker than the vibration(chattering) of the vibrator caused by the first signal if the small-feed setting signal is received during the discharge of the fine gains by the first weight while the vibrator is operated by the first control signal.

Next, the third control signal is a signal for stopping the operation of the vibrator provided at the device for measurement (300) if the dropping signal is received during the discharge of the fine grains by the second weight while the vibrator is operated by the second control signal.

Figure 6:
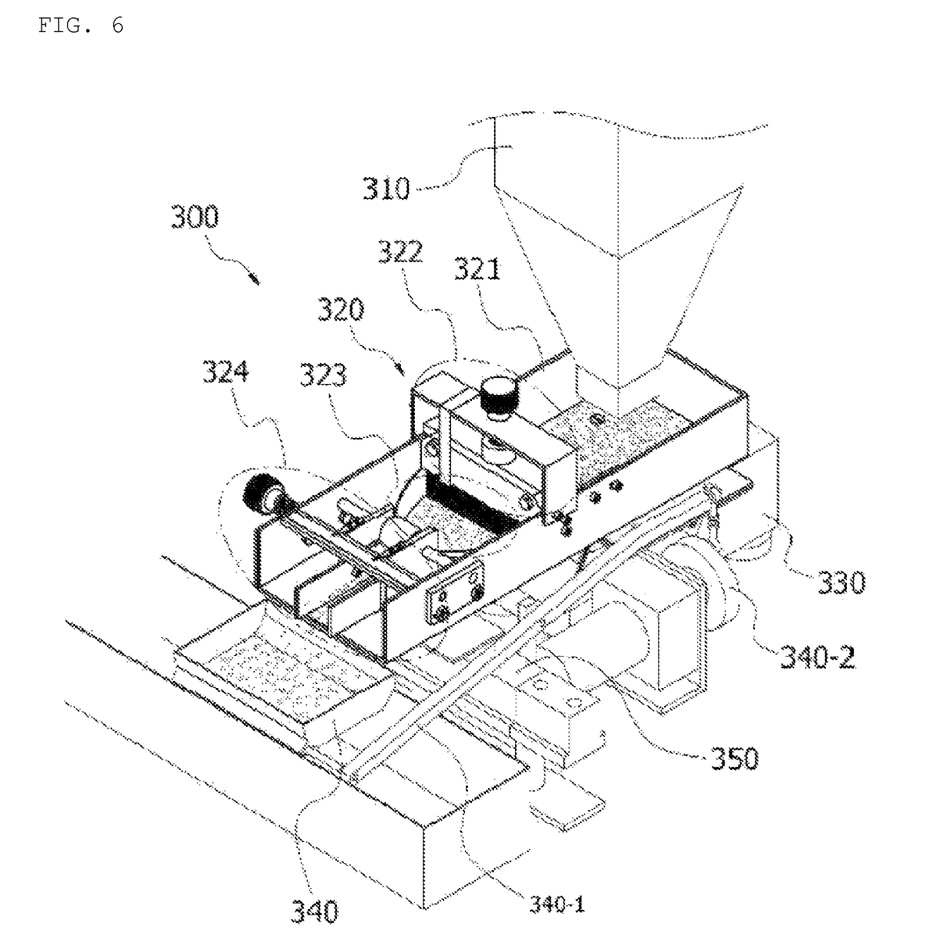
FIG. 6 is a view illustrating a configuration of the guide unit for measurement according to an embodiment of the present invention.

The device for measurement (300) includes a hopper (310), a guide unit for measurement (320), a vibrator (330), a container (340) and a balance (350) as illustrated in FIG. 6.

In more particular, the hopper (310) stores the fine grains such as powders, granules, seeds and pills.

The guide unit for measurement (320) constantly discharges the stored fine grains from the hopper (310).

In particular, the guide unit for measurement (320) includes a body part (321), a first adjusting part (322), a guide part (323) and a second adjusting part (324).

The body part (321) of the guide unit for measurement (320) temporarily stores the fine grains such as powders, granules, seeds and pills.

The first adjusting part (322) of the guide unit for measurement (320) has a first handle rod for adjusting an adjustment plate which is moved in an up-and-down direction from a bottom of the body part up to a certain level, and the fine grains are constantly fed through a gap created by adjustment of the first handle rod.

In the guide part (323) of the guide unit for measurement (320), a first guide fixing member) is provided on a wall surface of the body part and a second guide fixing member is provided on a wall surface opposite to the first guide fixing member. Furthermore, a first elastic guide plate is coupled at its one side with the first guide fixing member and a second elastic guide plate is coupled at its one side with the second guide fixing member. Therefore, the fine grains which have passed through the first adjusting part are guided and moved to between the other side of the first elastic guide plate and the other side of the second elastic guide plate.

In the second adjusting part (324) of the guide unit for measurement (320), the first plate and the second plate are provided, and the first fixing frame coupled with the first plate and the second fixing frame coupled with the second plate are formed, and the other side of the first elastic guide plate coupled at its one side with the first guide fixing member is fixed to the first fixing frame, and the other side of the second elastic guide plate is fixed to the second fixing frame, and the second handle rod is provided which adjusts the gap between the first plate and the second plate depending on the adjustment of the gap between the first fixing frame and the second fixing frame, and thus the fine grains passing through the guide part are discharged between the first plate and the second plate.

It is preferable that hair is further provided at an end of the adjustment plate.

It is preferable that a first graduated ruler is further provided which can measure a height of the gap created by the adjustment of the first handle rod.

It is preferable to further provide a first indication needle positioned on a top of the first fixing frame for indicating the first plate, a second indication needle positioned on a top of the second fixing frame for indicating the second plate and a second graduated ruler for representing the spacing between the first indication needle and the second indication needle.

A spacing buffer rod is preferably further provided which is disposed in parallel to the second handle rod and is coupled with the first and second fixing frames and which has a spring between the first and second fixing frames.

The above-described elements operates in an identical or similar manner to those described with reference to FIGS. 1 to 3, and thus further description thereof is omitted.

The vibrator (330) vibrates such that the fine grains discharged through the guide unit for measurement (320) are discharged by the first weight by the first control signal and vibrates such that the fine grains are discharged by the second weight by the second control signal, and the vibration is stopped so that the fine grains are discharged by the third weight through the dropping by the third control signal.

In other words, as the vibrator (330) is coupled with the guide unit for measurement (320), the fine grains in the guide unit for measurement (320) are discharged by the vibration(chattering) of the vibrator (330), wherein the vibration(chattering) is generated in the vibrator (330) by the first, second and third control signals received from the client (200).

The container (340) stores the fine grains discharged through the guide unit for measurement by the first, second and third control signals of the vibrator (330) in order to measure the fine grains.

In other words, the container (340) stores the fine grains in order to measure the first weight of the fine grains discharged through between the first and second plates of the guide unit for measurement (320), and automatically discharges the fine grains to the package when the first weight is reached.

In more particular, a container-rotating frame (340-1) is connected at its one side with the container (340) and is connected at the other side with a rotatable body (340-2).

Therefore, when the first weight of the fine grains are stored in the container (340), the balance (350) detects the first weight and thus the rotatable body (340-2) rotates. Accordingly, the container-rotating frame (340-1) connected with the rotatable body (340-2) is driven and thus the first weight of the fine grains stored in the container (340) are discharged to the package.

The balance (350) measures the fine grains stored in the container (340).

Optimal embodiments are disclosed in the drawings and the detailed description, and specific terms used above are used only for the purpose of describing the present invention, and are not intended to limit the meanings of the terms or the scope of the present invention defined by the following claims.

Therefore, a person skilled in the art will understand that various modifications and another equivalent embodiments may be made from the above-described embodiments, and the true scope of technical protection of the present invention should be defined by the technical concepts of the claims.

LIST OF REFERENCE NUMERALS 10, 321: body part
20, 322: first adjusting part
21: adjustment plate
22: hairs
23: first handle rod
24: first graduated ruler
30, 323: guide part
31: first guide fixing member
31-1: first gap
32: first elastic guide plate
33: second elastic guide plate
40, 324: second adjusting part
41: first plate
42: second plate
43: first fixing frame
43-1: first indication needle
44: second fixing frame
44-1: second indication needle
45: second handle rod
46: spacing buffer rod
46-1: spring
46-2: spring cover
47: second graduated ruler
100: indicator
200: client
300: device for measurement
310: hopper
320: guide unit for measurement
330: vibrator
340: container
340-1: container-rotating frame
340-2: rotatable body
350: balance

What is claimed is:

1. A guide unit for measurement comprising:
a body part temporarily storing fine grains such as powders, granules, seeds and pills;
a first adjusting part which has a first handle rod for adjusting an adjustment plate movable in an up-and-down direction from a bottom of the body part to a certain level, the fine grains being constantly fed through a gap created by adjustment of the first handle rod;
a guide part wherein a first guide fixing member is provided on a wall surface of the body part and a second guide fixing member is provided on a wall surface opposite to the first guide fixing member and wherein a first elastic guide plate is coupled at its one side with the first guide fixing member and a second elastic guide plate is coupled at its one side with the second guide fixing member, therefore, the fine grains which have passed through the first adjusting part are guided and moved to between the other side of the first elastic guide plate and the other side of the second elastic guide plate; and
a second adjusting part wherein a first plate and a second plate are provided and a first fixing frame coupled with the first plate and a second fixing frame coupled with the second plate are provided and wherein the other side of the first elastic guide plate coupled at its one side with the first guide fixing member is fixed to the first fixing frame and the other side of the second elastic guide plate is fixed to the second fixing frame and wherein a second handle rod is provided which adjusts a gap between the first plate and the second plate depending on the adjustment of a gap between the first fixing frame and the second fixing frame, the fine grains passing through the guide part being discharged between the first plate and the second plate.

2. The guide unit for measurement according to claim 1, wherein hair is further provided at an end of the adjustment plate.

3. The guide unit for measurement according to claim 1, wherein a first graduated ruler is further provided which can measure a height of the gap created by the adjustment of the first handle rod.

4. The guide unit for measurement according to claim 3, wherein further provided are a first indication needle positioned on a top of the first fixing frame for indicating the first plate, a second indication needle positioned on a top of the second fixing frame for indicating the second plate and a second graduated ruler for representing the spacing between the first indication needle and the second indication needle.

5. The guide unit for measurement according to claim 4, wherein a spacing buffer rod is further provided which is disposed in parallel to the second handle rod and is coupled with the first and second fixing frames and which has a spring between the first and second fixing frames.

6. A micro-weight measuring system using a guide unit for measurement, comprising:
an indicator which produces a weight setting signal, a small-feed setting signal and a dropping signal;
a client which produces a first control signal for performing a control by reception of the weight setting signal in such a manner that the fine grains are fed by a first weight corresponding to the weight setting signal, produces a second control signal for performing a control in such a manner that the fine grains are fed by a second weight corresponding to the small-feed setting signal if the small-feed setting signal is received during the discharge of the fine grains by the first weight, and produces a third control signal for performing a control in such a manner that the fine grains are fed by a third weight corresponding to the dropping signal if the dropping signal is received during the discharge of the fine grains by the second weight; and
a device for measurement which comprises a hopper for storing the fine grains; a guide unit for measurement which constantly discharges the stored fine grains from the hopper; a vibrator which vibrates such that the fine grains discharged through the guide unit for measurement are discharged by the first weight by the first control signal and vibrates such that the fine grains are discharged by the second weight by the second control signal, wherein the vibration is stopped so that the fine grains are discharged by the third weight through the dropping by the third control signal; a container which stores the fine grains discharged through the guide unit for measurement by the first, second and third control signals of the vibrator in order to measure the fine grains; and a balance which measures the fine grains stored in the container,
wherein the guide unit for measurement comprises:
a body part temporarily storing fine grains such as powders, granules, seeds and pills;

a first adjusting part which has a first handle rod for adjusting an adjustment plate movable in an up-and-down direction from a bottom of the body part to a certain level, the fine grains being constantly fed through a gap created by adjustment of the first handle rod;

a guide part wherein a first guide fixing member is provided on a wall surface of the body part and a second guide fixing member is provided on a wall surface opposite to the first guide fixing member and wherein a first elastic guide plate is coupled at its one side with the first guide fixing member and a second elastic guide plate is coupled at its one side with the second guide fixing member, therefore, the fine grains which have passed through the first adjusting part are guided and moved to between the other side of the first elastic guide plate and the other side of the second elastic guide plate; and a second adjusting part wherein a first plate and a second plate are provided and a first fixing frame coupled with the first plate and a second fixing frame coupled with the second plate are provided and wherein the other side of the first elastic guide plate coupled at its one side with the first guide fixing member is fixed to the first fixing frame and the other side of the second elastic guide plate is fixed to the second fixing frame and wherein a second handle rod is provided which adjusts a gap between the first plate and the second plate depending on the adjustment of a gap between the first fixing frame and the second fixing frame, the fine grains passing through the guide part being discharged between the first plate and the second plate.

7. The micro-weight measuring system using a guide unit for measurement according to claim 6, wherein hair is further provided at an end of the adjustment plate.

8. The micro-weight measuring system using a guide unit for measurement according to claim 6, wherein a first graduated ruler is further provided which can measure a height of the gap created by the adjustment of the first handle rod.

9. The micro-weight measuring system using a guide unit for measurement according to claim 8, wherein further provided are a first indication needle positioned on a top of the first fixing frame for indicating the first plate, a second indication needle positioned on a top of the second fixing frame for indicating the second plate and a second graduated ruler for representing the spacing between the first indication needle and the second indication needle.

10. The micro-weight measuring system using a guide unit for measurement according to claim 9, wherein a spacing buffer rod is further provided which is disposed in parallel to the second handle rod and is coupled with the first and second fixing frames and which has a spring between the first and second fixing frames.

* * * * *